United States Patent [19]

Tatch

[11] Patent Number: 5,431,827
[45] Date of Patent: Jul. 11, 1995

[54] DEVICE AND APPARATUS FOR RECOVERY OF DRY CLEANING FLUID, AND PURIFICATION OF WATER FROM DRY CLEANING WATER

[75] Inventor: Michael D. Tatch, Randolph, N.J.

[73] Assignee: Tatch Technical Services, Randolph, N.J.

[21] Appl. No.: 142,222

[22] Filed: Oct. 25, 1993

[51] Int. Cl.⁶ .................................................. B01D 37/00
[52] U.S. Cl. ................................... 210/767; 210/800; 210/663; 210/202; 210/221.2; 210/257.1; 210/257.2; 210/256; 210/338
[58] Field of Search ............... 210/650, 651, 767, 256, 210/288, 195.1, 195.2, 257.1, 257.2, 261, 800, 799, 663, 202, 203, 221.2, 176, 767, 338, 342; 95/254, 258; 96/134; 261/126

[56] References Cited

U.S. PATENT DOCUMENTS

| | | | |
|---|---|---|---|
| H1,206 | 6/1993 | Thibudeaux et al. | 95/254 |
| 1,994,372 | 3/1935 | Smith | 210/195.1 |
| 3,477,949 | 10/1967 | Liljendahl | 210/195.1 |
| 3,674,650 | 7/1972 | Fine | 210/167 |
| 3,738,127 | 6/1973 | Hyams | 34/73 |
| 3,774,768 | 11/1973 | Turner | 210/256 |
| 5,006,245 | 4/1991 | Yukishita | 210/256 |
| 5,279,746 | 1/1994 | Ziol | 96/134 |

FOREIGN PATENT DOCUMENTS 4122172  1/1993  Germany ........................ 210/800

Primary Examiner—Robert A. Dawson
Assistant Examiner—Ana M. Fortuna
Attorney, Agent, or Firm—Rosenman & Colin

[57] ABSTRACT

A discharge purification system for dry cleaning facilities is disclosed. The system comprises a series of concentric tanks providing settling and filtration treatment for water containing dry cleaning solvents. The device also provides for recycling solvent back to the dry cleaning facility.

20 Claims, 4 Drawing Sheets

DEVICE AND APPARATUS FOR RECOVERY OF DRY CLEANING FLUID, AND PURIFICATION OF WATER FROM DRY CLEANING WATER

FIELD OF THE INVENTION

The invention relates generally to dry cleaning plants, and particularly to devices for purifying dry cleaning water and recovery of dry cleaning fluids.

BACKGROUND OF THE INVENTION AND DISCUSSION OF THE PRIOR ART

Disposal of separated water from the vapor condenser and distiller sections of modern dry cleaning machines is a present problem without heretofore an easy answer. Some dry cleaners pour this water which condenses from the dry cleaning machine out the back door of their plant into the ground. Although there is no visual indication of dry cleaning solvents such as PERC (Perchloroethylene), this condensate water can still contain 150–2,000 ppm dissolved PERC solvent. If carry over or other malfunction of the dry cleaning machine has occurred, then the water may be even more potent.

Pouring this water on the ground will result in PERC contamination especially where there this disposal technique is continued over long periods of time. A paved parking lot or paved driveway is not a secure barrier to PERC solvent. It has been documented that PERC solvent will penetrate asphalt in less than 24 hours. Once in the soil the PERC will continue to penetrate the soil until it reaches bedrock. Most of the time, ground water is encountered on top of the bedrock. PERC then lays in the bottom of the ground water layer and slowly dissipates making the ground water unfit for human consumption. Applicant believes that this ground water contamination by PERC is much more of a threat than inhalation of PERC vapor.

Some dry cleaners trying to dispose of the water PERC mixture have routed the PERC mixture into the reservoir tank of the water cooler/heat exchanger (roof cooling tower). While this practice seems acceptable, the long term application of PERC solvent into the cooling water in high humidity and hot climates may cause accelerated corrosion of the cooling tower materials.

Pouring the water PERC mixture into a Hazardous Waste Containers is legal. However, many haulers have objected to adding water to the distillate residue as it makes the recovery distillation cycle more time consuming and less economical, and thus this route is very expensive if available at all.

Pouring the separated water into the drain and thus to a sewer treatment plant, is certainly better than pouring the water on the ground. However, many treatment plant operators, are issuing many new and stringent regulations on their sludge, discharge and disposal. Sewer treatment plant operators are also becoming more aware of where the solvents are coming from, and this will mean eventually that even small businesses will be regulated and monitored. In a small number of cases, broken sewer lines have caused problems for dry cleaners that have followed disposal of separator water into the municipal sewer treatment plan.

Pouring the separator water into a drain that leads to a septic system, or to a storm drain is unacceptable and should be discontinued immediately. The dry cleaner who practices this disposal technique will risk business ending expense, clean up expenses, as well as possible third-party liable. Further, a contaminated septic system may make the property and the business unsalable.

Heretofore, two alternatives have been used in the modern dry cleaning plant. One is evaporation, the other is constant flow pretreatment. In evaporation, the separator water is collected, vaporized, and exhausted, with a mist of water vapor going into the atmosphere. This has been used for many years by dry cleaners using homemade devices. When PERC saturated water is vaporized, the resulting steam or mist occupies significantly more space. The concentration of PERC in the mist or vapor is substantially less than in water. Therefore, the mist usually has less odor. While there are advantages of evaporation disposal, e.g. no liquid discharge to the sewer, and usually no carbon filters. The disadvantages are many. These include the operating cost of the steam and/or electricity required to vaporize the separator water, required air emission permits as may be needed in several jurisdictions, cost of maintenance of the heat exchanger heating element which is expensive, corrosion of the coils, and film which develops on the coils which reduces efficiency and must be cleaned. Also, capacity is usually low because of poor heat transfer, and noxious odors may be created in the plant. Finally, on electric models, the high power requirements may require separate circuits, additional line protection, ground faults, etc.

The constant flow water pretreatment approach has several possibilities. One is pretreatment of the water to minimize PERC content and monitor the levels of PERC being routed to the sewer treatment plant. Waste water pretreatment is a common technique used in other industries with great success. PERC may be easily removed from the water at relatively low concentrations found in separated water using the following techniques. Another is installation of supplemental mechanical separator, like the separator installed in the dry cleaning machine, to remove the PERC solvent. Several of the new dry cleaning machines displayed recently have such second separators. Several of these second separators have outlets which permit an operator to drain the machine to drain PERC liquid back to the distillation unit and water to the drain. These units are believed to have several shortcomings in that, depending upon the temperature and elevation, water can contain 400 plus ppm PERC without showing it. Another alternative is a liquid phase carbon, to remove solvents from water. The water is placed in contact with carbon, and under the right circumstances, of flow and distribution, the carbon will remove PERC from the water. Carbon used in this application may last long periods of time, but will eventually require legal disposal. Still another approach is air stripping, which has been used by environmental companies to treat ground water and remove halogenated solvents for several years. Because of its relative volatility, PERC can be stripped from separated water with the right application of air, temperature and distribution.

Although there are advantages to constant flow water pretreatment, and they include that steam and high energy sources are not required, maintenance is low, discharge odors are eliminated, and capacities are higher than evaporation; there are important disadvantages, of high cost, treated discharge into sewer, that disposal is still required, and a risk of not collecting all of the PERC, and thus releasing it.

Pretreatment is obviously a better alternative to evaporation disposal in locations where emissions are closely monitored, such as under apartments, or in malls. When state and local agencies respond to odor complaints, any and all discharges to the atmosphere become suspect. Businesses, such as large dry cleaners, laundries and linen services are presently using pretreatment for other waste water contaminants. Meanwhile, state agencies and sewer plant authorities have established programs for the registration and the regulation for pretreatment waste water. These regulatory systems have been in place for some time, are growing and are sometimes bureaucratic. Evaporation is obviously the better alternative in states and jurisdictions where sewer discharges are sensitive, and in addition, dry cleaning plants operating on septic systems which should avoid any and all industrial discharge into the septic system.

OBJECTS OF THE INVENTION

Some of the disadvantages of the prior art systems are overcome with the present invention. Features of the present invention include its simplicity and overall economy. The system is gravity fed and uses very little energy, only that required for a low pressure air fan. The space requirements are minimum, due in one embodiment to the arrangement of the various parts. The system is constant, and takes up and treats the water as it is provided. The PERC is separated, and may be recycled. The water at the outlet is suitably pure, and vented air is free of PERC and odors.

An object of the invention is to provide an apparatus and method for separating water and dry cleaning fluids from a dry cleaning separated water.

Another object is to provide an apparatus and method to purify water, having dry cleaning dissolved and dissoluble solvent and to recover for reuse the dry cleaning fluid, with efficiency and economy of operation, space and operating cost.

Another object of the invention is to provide an apparatus and method to receive contaminated water from a dry cleaning machine and purify the valet so that it may be discharged in compliance with the law, and in accordance with environmental considerations of both air and water.

SUMMARY OF THE INVENTION

According to an aspect of the invention, there is a three-stage, dry cleaning fluid water purification device, which has three concentric cylindrical tanks. An outer of said cylindrical tank is a settling tank and has an inlet, a first outlet, and a second outlet. The first outlet is located in a lower region of its tank for removing settled dry cleaning liquids which settle in said tank. The second outlet is located in an upper portion of the tank at an upper working level of liquid in the device, for removing water from which the dry cleaning liquid has settled out from said tank. The inlet is positioned between the two outlets for introducing drainage water containing small amounts of dissolved and dissoluble solvents. The said first tank is of a shape to permit separation of said dry cleaning liquid and water with the heavier dry cleaning liquid to be drawn off at the first outlet, and the lighter water, without said dry cleaning liquid to flow out at said second outlet. A middle of said three cylindrical tanks has a stripper tank and an inlet which is the first tank outlet, an outlet located in a lower portion of the tank, an air inlet in a lower portion of the tank, and an air outlet at a top portion of the tank. In the middle tank, gaseous components of said water are stripped or removed by the upward air flow through the water when liquid flows in a downward direction from the inlet to the outlet. An inner of the three cylindrical tanks has an inlet which is the middle tank outlet, and an outlet positioned near an upper portion of said tank at said working level of the liquid.

According to another aspect of the invention, there is provided a process for purifying water coming from a dry cleaning liquid machine, and includes the steps of settling the dry cleaning liquid which is in a water in a settling chamber; then removing the settled heavier dry cleaning liquid from a lower portion of the settling chamber and removing the lighter separated water from an upper portion of the settling chamber; then bubbling air through the removed water from removing gaseous components of dry cleaning fluid entrapped in the water; then passing the water after removal of the gaseous components through a filter medium.

These and other objects and features of the invention will become more apparent from the following detailed description which however is non-limitive of the invention.

DETAILED DESCRIPTION OF THE PREFERRED EMBODIMENTS

Figure 1A:
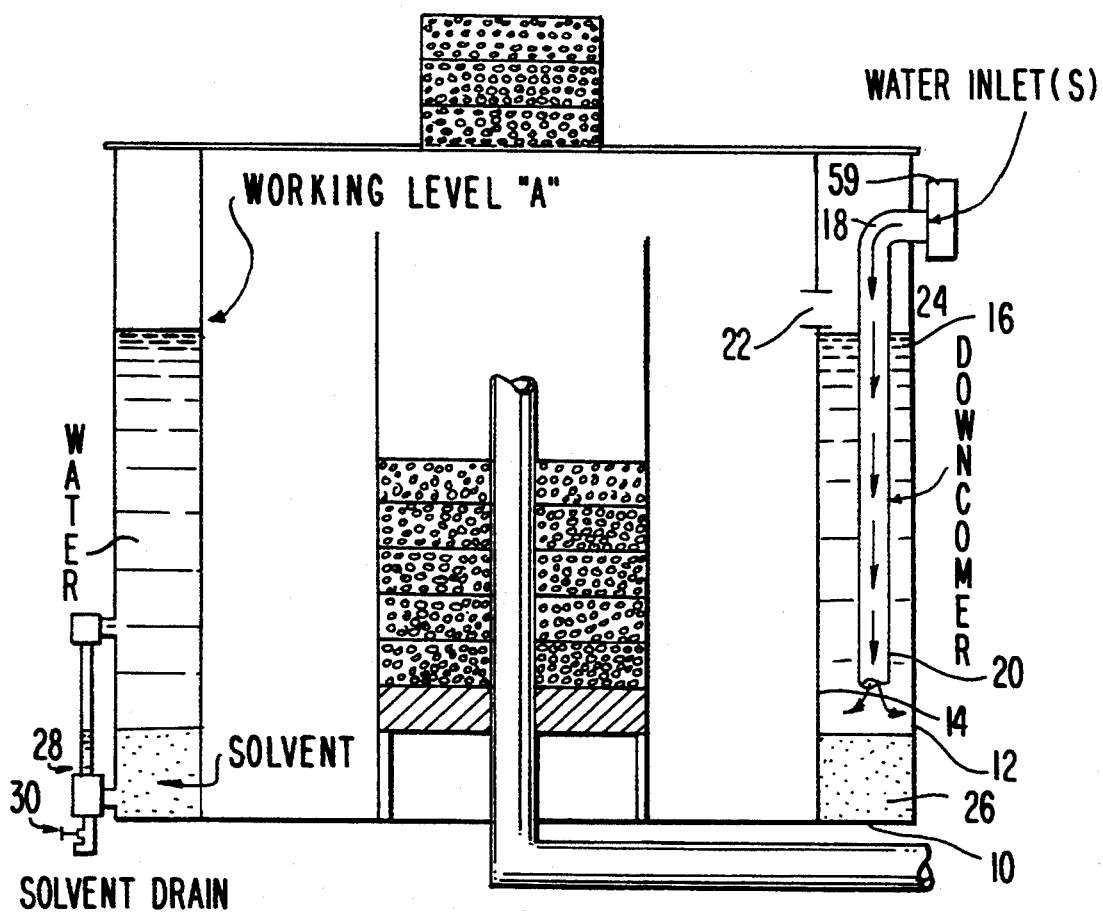
FIGS. 1(a), 1(b) and 1(c) are schematic cross-sectional views of one embodiment of the invention.

FIG. 1(a) is a schematic cross-sectional view of a water purification device of the invention. It is generally cylindrical in shape, and has a bottom plate 10, an outer shell 12, and a first inner shell 14. A portion of bottom plate 10, shells 12 and 14 define a first outer tank 16, and the outer tank 16 has an annular cross-section when viewed from above. A water inlet connection 18 receives a dry cleaning liquid, which is basically water with small amounts of dissolved and dissoluble solvent known commercially as PERC. The inlet is connected to a down comer pipe 20 which discharges the incoming liquid in a lower portion of the outer tank 16. The pipe 20 is shown in the drawing as a single pipe. In actuality, there are several down comer pipes 20 in tank 16, for example, four pipes evenly spaced.

On a wall of the inner shell 14, there is an opening 22 in the upper portion of the tank. A lower edge of the opening 22 defines a working level 24 of the water in the outer tank 16. The PERC in the incoming water, is heavier than the water and settles and is collected at the bottom of the outer tank 16. The water which is lighter, fills the outer tank to the working water level 24 and then flows through the outlet at 22. The FIG. 1(a) shows a single outlet 22, but it should be understood that there may be several outlets in the wall of the inner shell 14. The location of the several outlets is not critical and typically may be interspaced between the location of the down comer pipes 20.

A level indicator 28 is connected to one wall of the outer shell 12. The indicator provides a visual indication of the level of the solvent and the water. The solvent PERC is readily visually observable. A solvent drain 30 is connected to the outer tank 16 through the outer shell 12. This is to permit drawing off of solvent for its reuse. Any convenient or conventional drain and valve may be used.

Figure 1B:
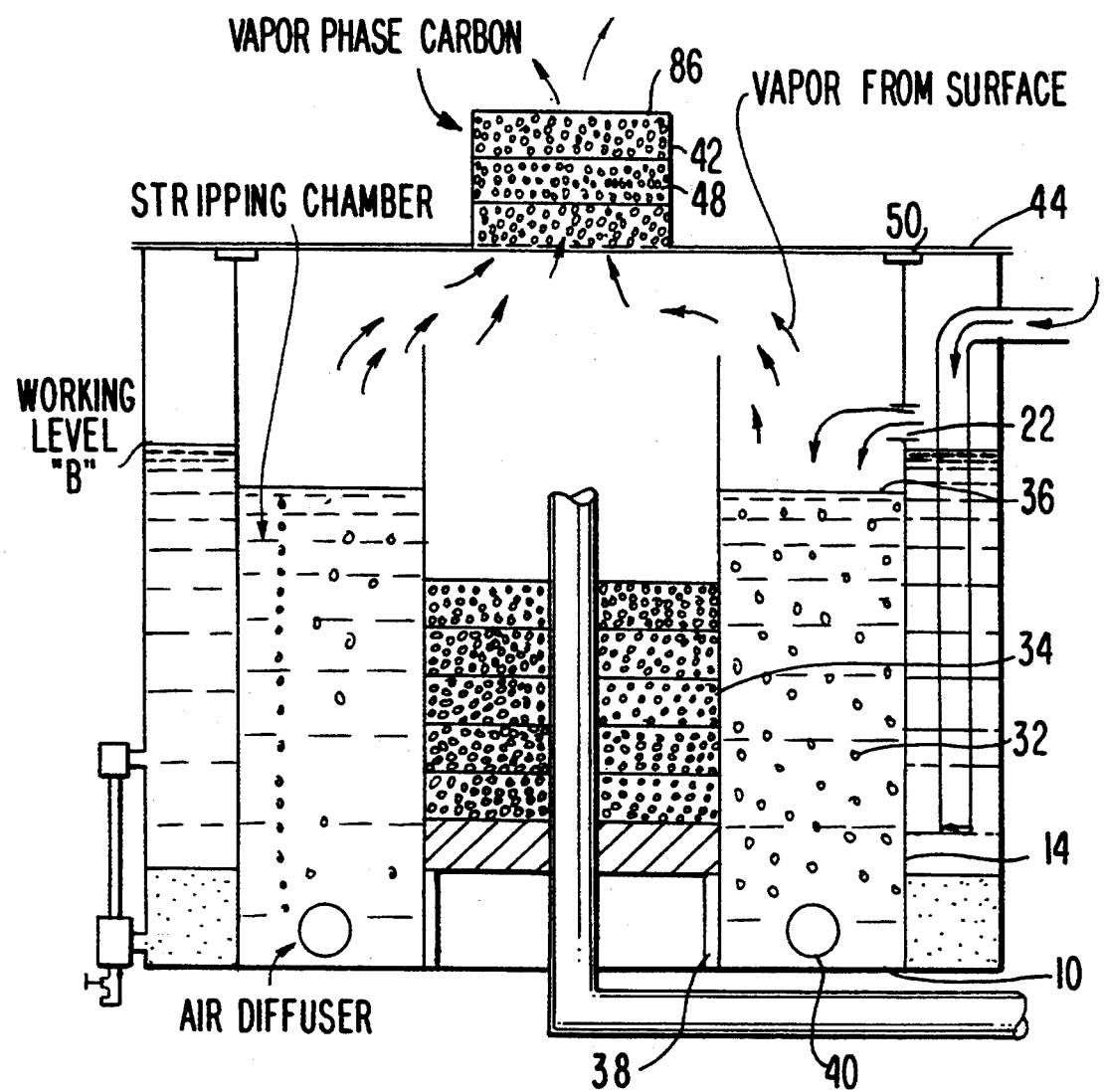

FIG. 1(b) is a view similar to FIG. 1(a) and shows an intermediate tank 32 between the inner shell 14, an intermediate wall 34, and the bottom plate 10. The intermediate tank 32 has an annular cross-section. Water from the outer tank 16 enters in an upper portion of the intermediate tank through the opening 22 and is shown flowing therein by curved down arrows (without legend). A working level 36 of the water in tank 32 is defined by a subsequent stage and is below the working level of the water 24 in the outer tank 16.

In a bottom portion of tank 34, on its intermediate wall 34, is an outlet port 38 for the flow of water. Thus water enters at the top and flows out at the bottom.

A 360° defuser tube 40 is located in a lower section of the intermediate tank 32. The defuser 40 has a circular cross-section as shown in FIG. 1(b) and when viewed from above, has an annular shape. Air under small pressure is introduced into the defuser tube 40, by for example a small air pump (not shown).

In operation, water leaving the outer tank enters the intermediate tank at the top and flows by gravity through the intermediate tank. This tank 32 performs the function of a stripping chamber due to air bubbles flowing from the defuser tube 40 upward through the water which is flowing to the bottom.

Vapor leaving the surface of the water in the stripping chamber 32 flows through a carbon tower 42 which is mounted on a top wall 44 that rests on and is sealed to the inner shell 14. The vapor shown with arrows (no legend) flows through the carbon tower 42 and exits through a port 46 in the tower. The vapor travels through a vapor phase carbon filter 48 which is contained in the carbon tower and which absorbs gaseous components of the dry cleaning media released in the stripping chamber. The purified air then escapes through the port 46.

The top wall 44 is sealed to the inner shell 14 as shown by seal 50.

Figure 1C:
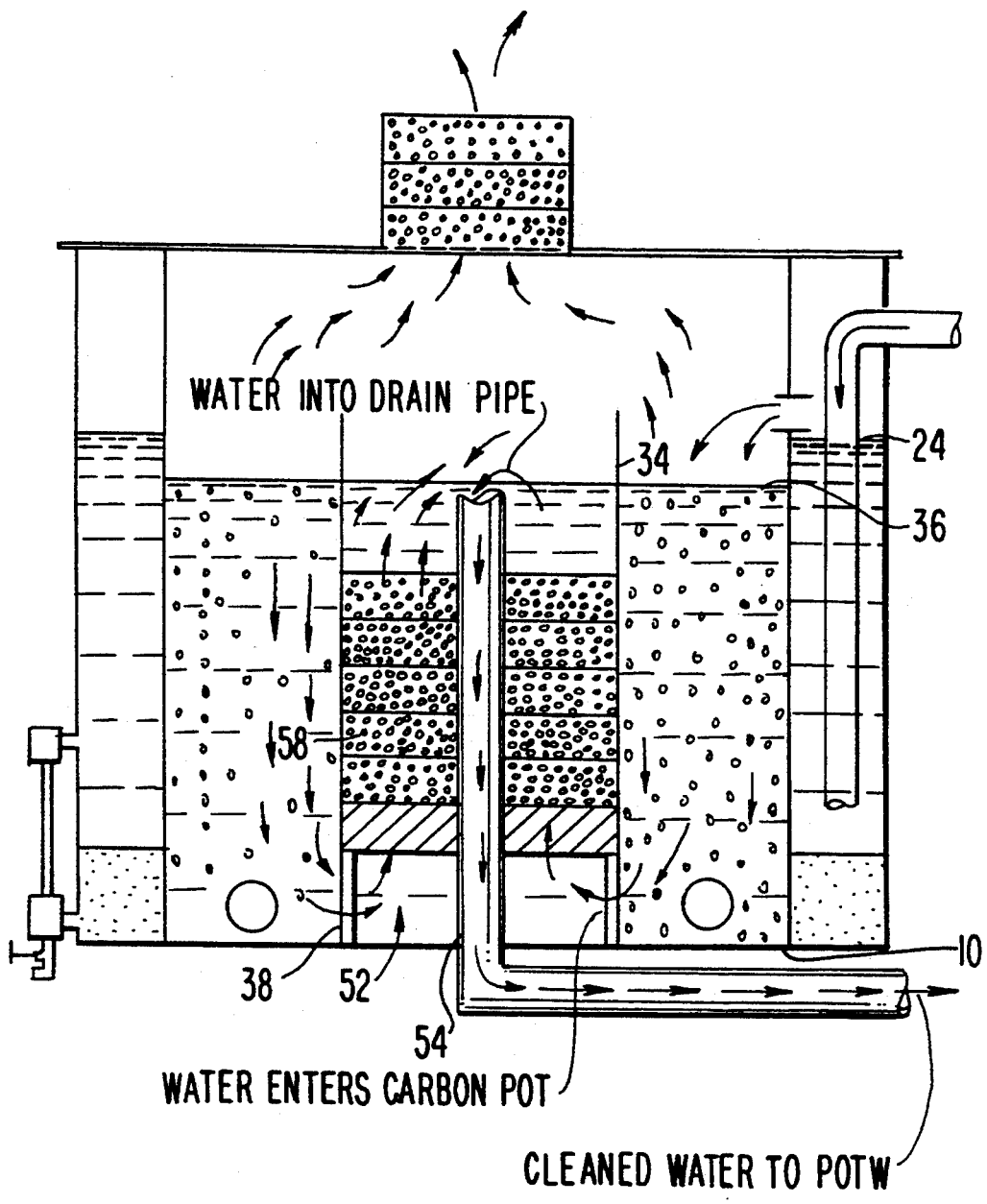

FIG. 1(c) is a cross-sectional view similar to FIGS. 1(a) and 1(b) and illustrates particularly an inner tank 52 of the device. The inner tank 52 is defined by the intermediate wall 34 at its outer surface, by a drain pipe 54 at its inner surface. The bottom of the inner tank is defined by the bottom wall 10.

Inlet to the inner tank is outlet 38 in the intermediate wall 34, which is at the lower portions of the both the intermediate and inner tanks. Thus, water enters through the bottom of the inner tank. Outlet from the inner tank is through the drain pipe 54° The height of the drain pipe 54 defines the working level 36 in the intermediate and inner tanks and is slightly lower than the working level of water 24 in the outer tank 16 which is defined by the opening 22.

Between the inner tank inlet 38, and the inner tank outlet at the upper end of the drain pipe at 56, there is located a filter 58 which in cross-section (but not necessarily in height) occupies substantially the entire annular space so that water must flow there through. The filter may be a one-stage or a two-stage carbon filter. Any convenient or conventional filter or filter system may be used for the filter 58.

In a preferred embodiment, the drain pipe 54 is permanently attached to the bottom wall 10. A second pipe (not shown) slips around the drain pipe 54 and forms the inner wall of a basket assembly whose outer wall is the intermediate wall 34, and between the two walls there is the filter 54, and at the lower portion the openings 38.

Thus, the basket can be easily removed as needed, whenever the filter 58 needs to be replaced.

In operation, and with reference to FIGS. 1(a)–1(c), contaminated water enters the device through an inlet 18, that is connected to a down comer 20, (and preferably there are several down comers) which takes the contaminated water to the bottom of the outer annulus space or settling tank. The heavier solvent separates from the water by gravity. The solvent will build up on the bottom of the outer chamber in region 26 and will be visible in the level indicator 28 on the outside. The solvent may be drained from the outer chamber using the drain valve 30, or any other convenient or conventional valve arrangement, at the bottom of the level indicator or at any other convenient location.

The water leaves the outer chamber and flows by gravity into the intermediate tank or stripping chamber where air bubbles released from the bottom flow to the top. The air is introduced into the stripping chamber by a 360° defuser tube 40, which is pressured by a small air pump (not shown). Vapor leaving the surface of the stripping is forced through the carbon tower 42 built onto the top of the device. The top cover 44 is sealed at the intersection of the intermediate wall 34 and the top cover. Vapor must travel through the vapor phase carbon 48 which is contained in the carbon tower 42 of the top cover. Air then escapes the device through a small hole in the top cover.

The water leaving the stripping chamber where it is flowing downward, and then flows upward in the inner tank, and here passes through a carbon filter 58. Holes in the bottom of the carbon filter allow the water to flow through the filter media before leaving the device by flowing down the drain pipe 54 which protrudes above the carbon filter level. The water flows through the drain pipe by gravity until it reaches the end of the pipe on the lower edge of the outer cylinder.

A membrane filter may be inserted, upstream of the downcomers or before the water inlet to trap particulate matter.

Figure 2:
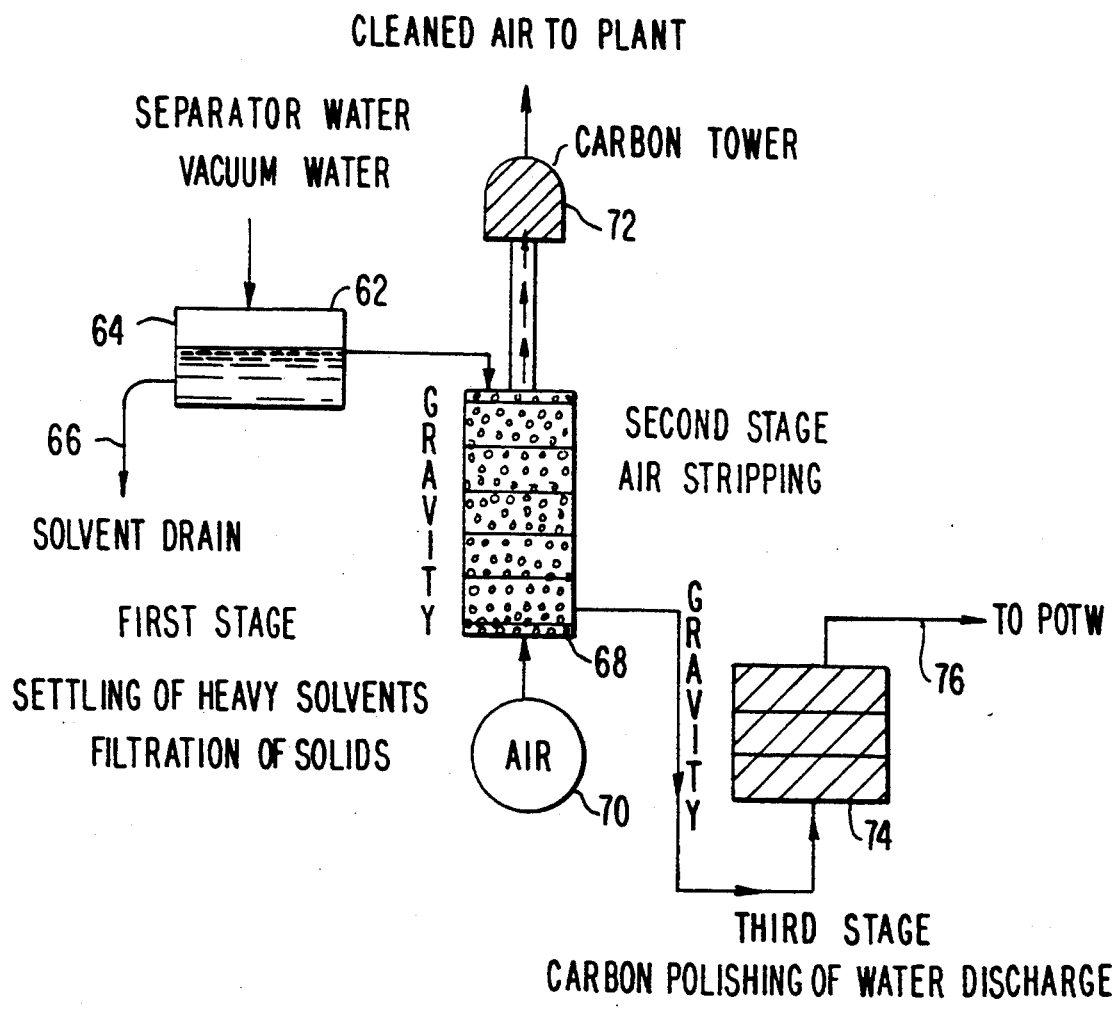
FIG. 2 is a function diagram of one embodiment of the invention.

FIG. 2 is a function diagram or flow chart illustrating the three stage water purification of the device.

Beginning at the upper left hand corner of the Figure, there is shown water draining from a dry cleaning machine or vacuum equipment, and the water contains small amounts of dissolved and dissoluble solvent PERC. The water is introduced through a filtration membrane 62 into a settling chamber 64. PERC being significantly heavier than water, settles to the bottom of the chamber, where it can be drained for reuse 66.

In a second stage, water is then drained from the first stage to a stripping chamber 68 where air bubbles are introduced 70 in a counterflow direction, in that the water is flowing downward in the stripping chamber and the air bubbles are flowing upward. The air bubbles arriving at the bottom, pick up gaseous components in the water, and leave the chamber through a carbon tower 72 containing vapor phase carbon, (which absorbs impurities and pollutants), and then releases the atmosphere. The carbon in the tower must be changed or reactivated at intervals.

In a third stage, water leaves the second stage and is drained again by gravity into a chamber 74 containing a liquid phase carbon filter. Water flows through this carbon before leaving the device at pipe 76. The carbon in chamber 74 must be changed or reactivated at intervals. It will be noted that all of the draining is done by gravity.

The device has several advantageous features. Preferably, it is made of a light gauge carbon steel and plastic. It is in the shape of a series of concentric cylinders. The cylinders of the outer shell and intermediate wall, are preferably welded to the bottom wall or plate to form water tight chambers. The drain pipe 54 preferably is welded to the bottom plate. The intermediate wall and support for the carbon filter is preferably of a plastic material and forms a basket which slips around the drain pipe and rests on the bottom wall, and which can be easily removed. This unique structure provides an even flow and large water inventory capacity for the relatively small space requirement of the device.

Another advantageous feature of this device is that it works without water pumps or large amounts of energy. The system is gravity fed, and thus brings about longevity as well as low maintenance and low cost. The air pump is the sole pump for the system.

The replaceable materials, namely the carbon of the filter, are readily available from several commercial sources and preferably the design may utilize bulk material instead of expensive preformed shapes or filters. This also allows for the possibility of reclaiming and reuse of the carbon of the filters.

In a preferred embodiment the following dimensions were found advantageous outer tank diameter: 14 inches
intermediate tank diameter: 10 inches
inner tank diameter: 6 inches
drain pipe diameter: 2 inches
working level of water in outlet tank: 10 inches
working level of water at drain pipe top: 7 inches
flow rate, typical: 1 gal/hour
maximum 2.5 gal/hour; minimum 0 gal/hour.
air pump: 1.2 cubic feet/minute The preferred embodiment has been shown with coaxial concentric cylindrical tanks. It should be understood that other shapes may be used, e.g. elliptical or multi-sided, tanks or nonconcentric, and variations in the relative heights and other forms may also be used without departing from the scope and spirit of the invention.

I claim:

1. A three-stage dry cleaning fluid drainage water purification device, comprising:
   (a) an outer cylindrical tank having an inlet, a first outlet, and a second outlet, said first outlet being located in a lower portion of said first tank for removing dry cleaning fluid which settles in said tank, said second outlet being located in an upper portion of said tank at an upper working level of liquid in said device, for removing water from said tank,
   said inlet being positioned for introducing dry cleaning fluid drainage water containing small amounts of dissolved and dissoluble dry cleaning fluid components,
   said first tank permitting separation of said dry cleaning fluid and said water by the settling, so that the heavier dry cleaning fluid is drawn off at said first outlet and said lighter water, flows out at said second outlet
   (b) a middle cylindrical tank having an inlet that is said first tank outlet,
   an outlet located in a lower portion of said middle tank,
   an air inlet in a lower portion of said middle tank, and
   an air outlet at a top portion of said tank, whereby dry cleaning fluid in said water is vaporized by the air flow upward through said middle tank and removed from said water while said water flows in a downward direction from said inlet to said outlet,
   (c) an inner tank having an inlet that is said middle tank outlet, and
   an outlet positioned near an upper portion of said inner tank so as to provide a lower working level of the liquid in said device.

2. The device according to claim 1, wherein said outlet of said inner tank is a tube, coaxial with said cylindrical tanks, extending through a bottom portion of said inner tank.

3. The device according to claim 1, wherein said outer tank first outlet comprises a valve for selectably drawing off said settled dry cleaning fluid.

4. The device according to claim 1, further comprising a visually readable indicator of a level of dry cleaning liquid which has settled at the bottom of said outer tank.

5. The device according to claim 1, wherein said outer tank has a diameter of approximately 14 inches,
   said middle tank has a diameter of approximately 10 inches,
   said inner tank has an outside diameter of approximately 6 inches,
   said working levels of liquid being approximately 10 inches high, and adapted to provide a flow through rate in the range of 0.5 to 2.5 gallons per hour.

6. The device according to claim 5, wherein said inner tank outlet is a pipe, coaxial with said cylindrical tanks, extending through a bottom portion of said inner tank and said pipe and having a diameter of approximately 2 inches.

7. The device according to claim 1, further comprising a membrane filtration member for removing particulate matter upstream from said outer tank inlet.

8. The device according to claim 1, further comprising a carbon tower mounted above said middle tank for receiving gases emerging from said water in said tank.

9. The device according to claim 8, wherein said device contains a liquid-phase carbon filter and a vapor-phase carbon filter.

10. The device according to claim 1, wherein said outer tank inlet, comprises a plurality of down comers, spaced from one another in said outer tank.

11. The device according to claim 1, wherein said inner tank has a carbon filter located between its inlet and outlet, said filter extending substantially across the entire diameter of said inner tank.

12. The device according to claim 1, further comprising a liquid phase carbon filter, connected to a said inner tank outlet, for filtering said water passing through said inner tank.

13. The device according to claim 1, wherein said middle tank air inlet comprises a 360° diffuser tube.

14. A process comprising the steps of
   (a) settling a dry cleaning liquid water mixture in a settling chamber,
   (b) removing the settled heavier dry cleaning liquid and separately removing the lighter separated water,
   (c) bubbling air through the removed water from step (b) for removing gaseous impurities from said water, (d) passing the water after removal of the gaseous impurities therefrom in step (c) through a filter medium, whereby the above sequence of steps produces reusable dry cleaning liquid and sufficiently clean water which may be recycled or disposed of.

15. The process according to claim 14, wherein prior to said settling step, said dry cleaning liquid water mixture is passed through a membrane filter for removing particulate matter.

16. The process according to claim 14, wherein said filter medium in step (d) is carbon.

17. The process according to claim 14, further comprising the step of passing the air and gaseous impurities which emerges from the water while the air is bubbling therethrough in step (c), through an absorptive medium for absorbing said gaseous impurities.

18. The process according to claim 14, wherein said water flows by gravity through said process.

19. The process according to claim 18 wherein said water flows through said process at a rate of approximately 0.5 to 2.5 gallons per hour.

20. A three-stage dry cleaning fluid drainage water purification device, comprising:

first, and second tanks, the first tank having an inlet, a first outlet, and a second outlet; said first outlet being located in a lower portion of said tank for removing heavier dry cleaning fluid which settles in said tank, said second outlet being located in an upper portion of said tank, for removing water from which the dry cleaning fluid has settled-out in said tank, said inlet being positioned for introducing drainage water containing dry cleaning fluid, and the second tank having an inlet being said first tank outlet located in an upper portion of said first tank, an outlet located in a lower portion of said second tank, an air inlet in a lower portion of said second tank, and an air outlet at a top portion of said second tank, whereby dry cleaning fluid in said water is vaporized by the air flow upward through said second tank and removed from the water while said water flows therein in a downward direction from said inlet to said outlet.

* * * * *